United States Patent [19]

Johnson et al.

[11] 4,342,506
[45] Aug. 3, 1982

[54] EXPOSURE TRIM MECHANISM FOR CAMERAS

[75] Inventors: Bruce K. Johnson, Andover; Kenneth P. Black, South Weymouth, both of Mass.

[73] Assignee: Polaroid Corporation, Cambridge, Mass.

[21] Appl. No.: 236,339

[22] Filed: Feb. 20, 1981

[51] Int. Cl.³ .............................................. G03B 7/14
[52] U.S. Cl. ...................................... 354/27; 354/29; 354/230
[58] Field of Search ................... 354/27, 29, 30, 226, 354/230, 235, 245, 246, 248, 249, 256, 257, 259, 260

[56] References Cited

U.S. PATENT DOCUMENTS

| | | | |
|---|---|---|---|
| 2,238,500 | 4/1941 | Minalyi | |
| 3,887,934 | 6/1975 | Ettischer | 354/251 |
| 3,969,738 | 7/1976 | Johnson et al. | 354/230 |
| 4,109,258 | 8/1978 | Arisaka et al. | 354/38 |
| 4,209,243 | 6/1980 | Johnson et al. | 354/30 |

Primary Examiner—Russell E. Adams
Attorney, Agent, or Firm—David R. Thornton

[57] ABSTRACT

A trim mechanism for an automatic exposure control system used in photographic cameras to regulate the rate at which a pair of scanning shutter blades are accelerated toward an open position so as to vary the effective flash aperture as well as to variably filter light passing to the photocell of an electronic system for closing the shutter blades. The mechanism includes an arrangement of a manually adjustable trim slide, a trim slide follower and a tension spring extending directly between the follower and the shutter blade mechanism so that the tension of the spring and thus the force by which the blades are driven to an open position is adjusted simultaneously with adjustment of a photocell filter variation.

6 Claims, 4 Drawing Figures

EXPOSURE TRIM MECHANISM FOR CAMERAS

BACKGROUND OF THE INVENTION

1. Field of the Invention

This invention relates to exposure trim mechanisms for photographic cameras and more particularly, it concerns improvements in the construction of such mechanisms by which both increased reliability in operation and reduced manufacturing costs are attained by comparison to the prior art relating to such trim mechanisms.

2. Description of the Prior Art

Commonly assigned U.S. Pat. No. 4,209,243, issued June 24, 1980 to Bruce K. Johnson and George D. Whiteside discloses an exposure trim mechanism for photographic cameras of the type having an automatic exposure control system, including a scanning shutter, by which such exposure parameters the exposure interval and the effective flash aperture are dependent respectively on the amount of light passing from the scene to a photoresponsive detector and the range of the subject. For determining the effective flash aperture, an electronic strobe is fired at time periods (following initial shutter opening) which are selected in relation to subject range so that flash illumination is synchronized with a suitable aperture for each subject distance.

In the trim mechanism disclosed in the above-noted issued patent, for example, a manually adjustable slide is supported from the camera body both to regulate the speed to which a pair of variable aperture shutter blades are accelerated toward an open or exposure condition and to regulate the response characteristics of a photoelectric exposure control circuit in a manner to increase or decrease from a normal amount, the image light to which camera loaded film is exposed. Regulation of the shutter blade accelerating function, which primarily effects the flash contribution to the exposure, is achieved mechanically by adjustment of the starting point of an accelerator member. Photoresponsive regulation is achieved by a variable density filter carried by the slide in front of the photoresponsive detector or cell to vary the amount of subject or scene light passing to or "seen" by the cell. Both regulating functions contribute to adjustment of the film exposure. With respect to the variable density filter, for example, normal exposure of photographic film in the camera will result when a medial density portion of the filter is positioned in front of the cell. Correspondingly, the exposure control system may be trimmed to either an underexposure mode upon movement of the slide to reduce the filter density and thus increase the light seen by the cell to a value above that indicated for normal exposure, or to an overexposure mode by moving the slide in the opposite direction to increase filter density and thus reduce the amount of light seen by the cell to a value below that which would pass the filter for normal exposure.

On the other hand, the additional trim function provided by varying the rate of shutter blade opening acceleration is important where a burst of illumination, such as from a flash bulb or electronic flash, is used for film exposure. The additional trim function is needed to compensate for limitations on the overall shutter system to respond fully to measured light within the short time duration of this type of illumination. Thus, by slowing the initial shutter blade acceleration, the effective aperture reached by the shutter blades during at least the main portion of the flash is reduced. Correspondingly, the effective flash aperture can be increased from a norm by increasing the rate of shutter blade opening acceleration.

Although the exposure control systems and trim control mechanisms of the general type represented by the disclosure of the aforementioned U.S. patent are applicable to all types of photographic cameras, such systems and mechanisms have been used extensively in self-developing or instant cameras manufactured by Polaroid Corporation, Cambridge, Mass. Because of the facility offered by instant cameras for immediately retaking an improperly or undesirably exposed photograph, the trim mechanism has special utility in providing the camera user with an opportunity to correct or modify the darkness or lightness of the subject appearing in a photograph. The trim mechanism is equally important in taking a first photograph to photographers who recognize abnormal lighting conditions. For backlighted subjects, for example, the trim mechanism should be set for a measure of overexposure (or lightening trim) because the back lighting will cause a corresponding measure of underexposure or darkening of the principal subject to be photographed. The opposite is true of a subject brightly illuminated by fore-lighting against a dark background.

The function of the trim mechanism disclosed in the aforementioned U.S. patent is, therefore, an important adjunct to the overall exposure control system for cameras generally and in particular, for the exposure control systems of self-developing or instant cameras of the type referred to. Because of the degree of precision needed for such regulation, the limitations on the space available for the overall exposure control system, and the importance of the trim mechanism to overall camera effectiveness, there is a need for an enhanced combination of structural simplicity, reliability and manufacturing cost effectiveness in trim mechanisms of this type.

SUMMARY OF THE INVENTION

In accordance with the present invention, an improved trim mechanism is provided by which shutter blade scanning is regulated by a controlled bias acting directly between the shutter blade assembly and an adjustable slide member of which a variable density, light-sensing-cell filter is a part. The slide member is preferably, but not necessarily, a unitary molding of synthetic resinous material in which the variable density filter is integrally formed and which defines a cam surface for translating linear slide movement to variable movement in a follower attached to one end of a shutter spring. The other end of the shutter spring, preferably a simple tension spring, is connected directly with a pivotal walking beam to which the shutter blades are pivoted for simultaneous movement in opposite directions between open and closed conditions. The cam follower is pivoted from a fixed fulcrum and carries a series of spring hooks by which spring tension may be initially calibrated. The slide member is retained in a medial or "normal" position by a spring detent. Also, the spring tension regulating cam slot includes a dwell portion against which the follower seats when the slide member is in the detent-retained normal position.

A principal object of the present invention is, therefore, the provision of a trim mechanism for photographic cameras of the type referred to and by which accurate control over shutter blade movement is effected by relatively simple structural organization of parts. Other objects and further scope of applicability of the present invention will be apparent from the detailed description to follow taken in conjunction with the accompanying drawings in which like parts are designated by like reference numerals.

DETAILED DESCRIPTION OF THE PREFERRED EMBODIMENTS

Figure 1:
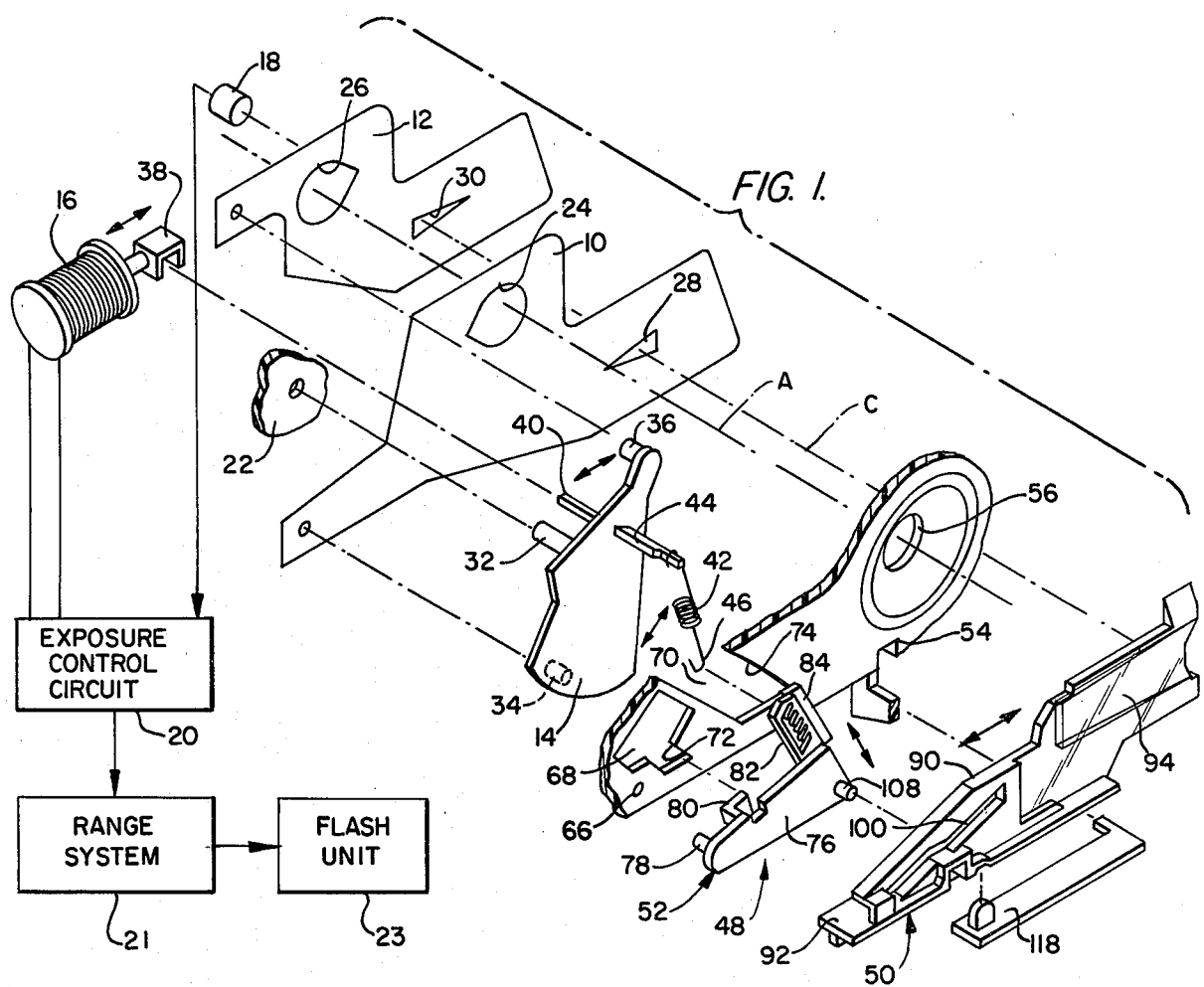
FIG. 1 is an exploded perspective view illustrating primary components of an exposure control system in which the present invention is intended for use.

In FIG. 1 of the drawings, working components of an automatic exposure control system for a camera are shown in generally schematic form to include a pair of shutter blades 10 and 12, a walking beam 14, a solenoid 16, a light sensing cell 18 and a control circuit 20 which, as later explained, controls various exposure functions including operation of the solenoid 16 in response to an output from the cell 18. These components are typically carried by a camera shutter board or equivalent structure represented only partially in FIG. 1 and designated by the reference numeral 22. The shutter blades 10 and 12 define shaped exposure apertures 24 and 26, respectively, which may be oppositely directed tapered openings as shown or of other suitable configurations so that when the blades 10 and 12 are reciprocated in opposite directions, the apertures move from a closed condition in which they are out of registry with each other, progressively through a variable aperture to a full open condition concentric with the objective axis A of the camera. The shutter blades 10 and 12 further define auxiliary apertures 28 and 30, respectively, which function to provide an opening on the axis C of the cell 18 and by which light passing to the cell is is correlated with light passing through the primary apertures 24 and 26 during opening movement of the shutter blades 10 and 12.

The walking beam 14 is pivoted from the shutter board 22 by a stub shaft 32 positioned centrally between a pair of pins 34 and 36 which pivotally engage the shutter blades 10 and 12, respectively. Pivotal movement of the walking beam about the axis of the shaft 32 is controlled in one direction by the solenoid 16 through a yoke 38 adapted to engage an eccentric bracket 40 projecting rearwardly from the walking beam 14. In light of the illustrated structure and as fully disclosed in the aforementioned U.S. patent among others, movement of the shutter blades 10 and 12 between a closed and open condition during an exposure cycle is dependent on pivotal movement of the walking beam. Moreover, the arrangement of the solenoid 16 and the connection thereof through the yoke 38 and bracket 40 is typically such that upon energization of the solenoid 16, the walking beam 14 will pivot to bring the blades 10 and 12 into a fully closed condition in which the apertures 24 and 26 are out of registry to block light passing along the objective axis A. Correspondingly, de-energization of the solenoid 16 will permit movement of the walking beam 14 and the shutter blades to an open condition.

Included in the camera arrangement is a range system 21 and a flash unit 23 which, as set forth in the aforementioned patent, produce a pulse of illumination directed at the scene in timed relation to the scanning of the shutter blades 10 and 12. The range system 21 is preferably a sonic ranging system which produces a time period related to subject distance. This time period, or one proportionally related thereto (depending on the normal blade scanning rate) is employed to fire the flash unit 23, preferably an electronic flash unit, at a selected point during progression of the blades through enlarging apertures. This produces a pulse of illumination in relation to an aperture value selected in accordance with subject distance.

As explained in the aforementioned patent, for precise synchronization of the initiation of shutter opening and the start of the range-related interval, the control circuit 20 includes a first light detect unit (not shown). Consequently, with the trim mechanism located in its normal position described below, the flash occurs at different aperture values in accordance with subject distance.

In accordance with the present invention, opening movement of the shutter blades 10 and 12 is effected by a shutter spring, the force of which is adjustable to vary the rate of scanning of the blades 10 and 12 upon de-energization of the solenoid 16. Specifically, a tension spring 42 is connected at one end with a forwardly projecting stud 44 located on the walking beam 14, and which is generally aligned with the solenoid bracket 40 to be eccentric with respect to the pivot shaft 32. The other end 46 of the spring 42 is connected with an adjustable trim mechanism designated generally by the reference numeral 48 in FIG. 1 and to be described in more detail below.

Figure 3:
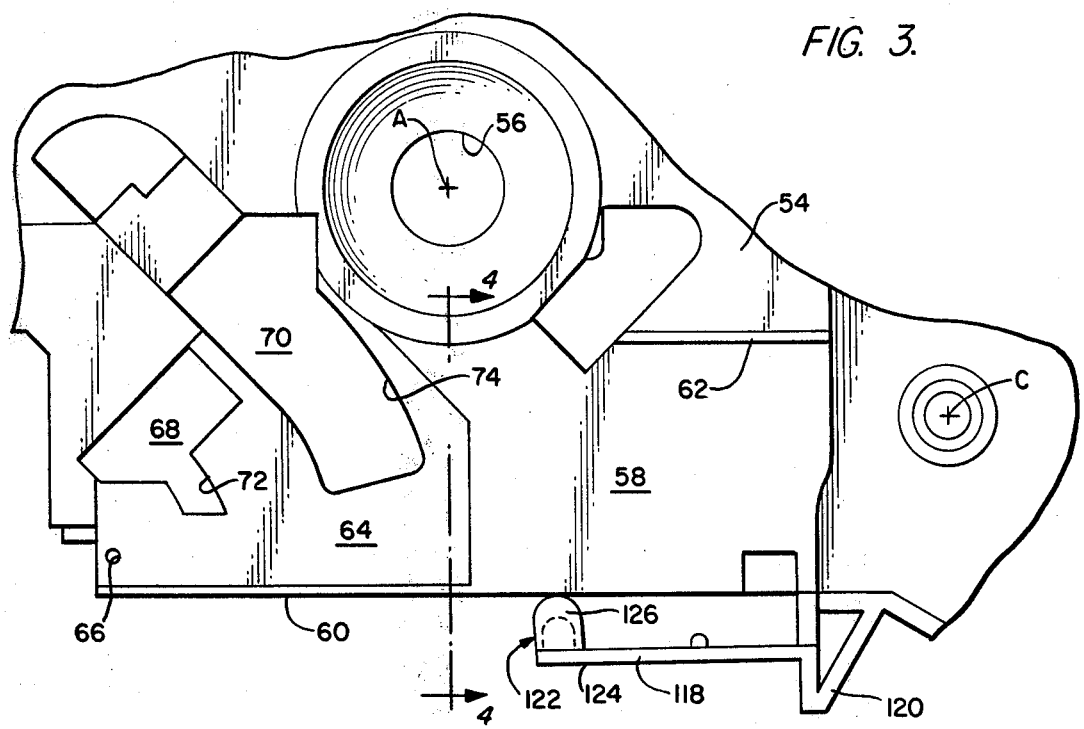
FIG. 3 is a fragmentary front elevation of a lens mounting plate from which the trim mechanism is supported.

The trim mechanism 48 includes a trim slide 50 and a pivotal trim follower 52, both of which are adapted to be carried on a lens mounting plate 54. The lens mounting plate 54 defines a maximum lens aperture 56 on the objective axis A and in practice is fixedly supported from the shutter board 22 in generally spaced parallel relationship forwardly of the shutter board 22. As shown most clearly in FIG. 3, the front face of the lens mounting plate 54 includes a planar bearing surface 58 extending between a linear bottom edge 60 and a forwardly projecting rail 62 generally parallel to the bottom edge 60. To the left of the surface 58 as shown in FIG. 3, is a recessed floor 64 in which is formed a pivot hole 66 and a pair of openings 68 and 70 defining arcuate wall edges 72 and 74, respectively.

Figure 2:
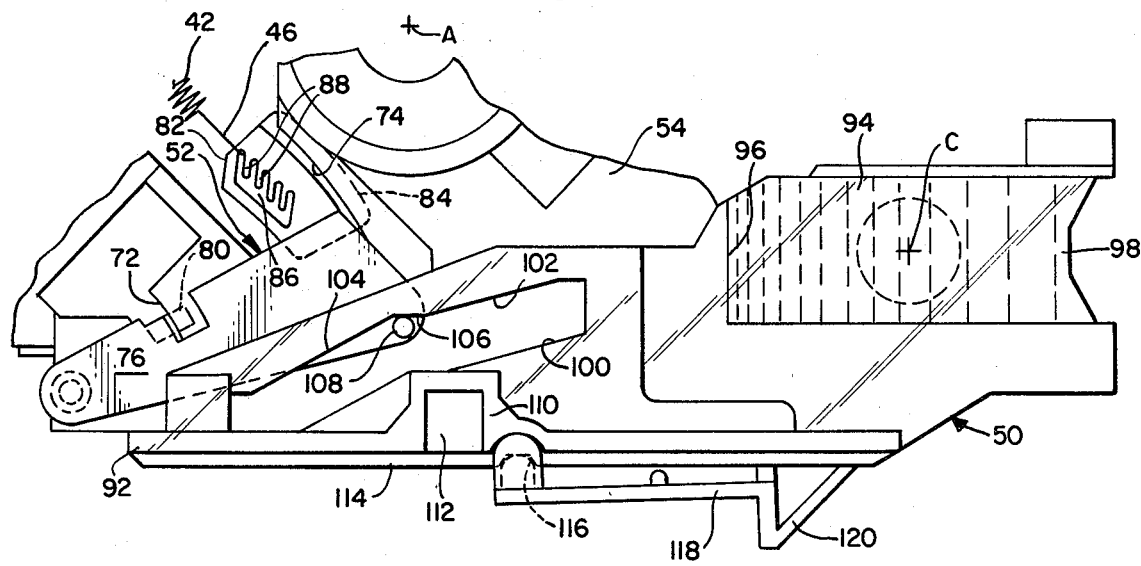
FIG. 2 is an elevation view illustrating the working components of the trim mechanism of the present invention.

As shown in FIGS. 1 and 2, the trim follower 52 includes a tapered or wedge-like body plate 76 having on its rear surface a pivot post 78, a struck out L bracket 80 and a spring connection bracket 82 spaced from the axis of the pivot post.

The spring connection bracket 82, as shown most clearly in FIG. 2, includes a through opening 86 defining along one edge a series of spring hooks 88 by which the end 46 of the tension spring 42 may be secured to the trim follower 52. Initial tension on the spring 42 may be calibrated depending on which of the hooks 88 are engaged by the end 46.

Figure 4:
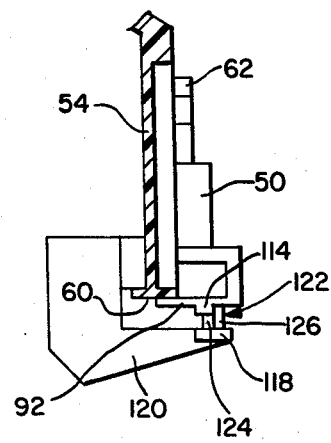
FIG. 4 is a cross-section on line 4—4 of FIG. 3 to which the trim slide has been added.

As shown in FIGS. 1, 2 and 4 of the drawings, the trim slide 50 is an integral or unitary component molded from synthetic resinous material capable of being made semi-transparent by appropriate color dyes. The configuration of the molded trim slide 50 defines a generally plate-like body 90 upstanding from a flanged base 92. The body plate 90 is molded to define a generally rectangular filter wedge portion 94 which varies along its length between a high filter density at one end 96 to a low filter density at the other end 98. The filter portion 94, as shown in FIG. 2, is arranged to intersect the axis C of the photocell 18.

The body plate 90 of the trim slide 50 further includes an inclined aperture 100 which defines along its upper edge (see FIG. 2) a pair of cam or inclined ramp surfaces 102 and 104 separated by a dwell surface 106. The aperture 100 is positioned to receive a follower pin 108 projecting forwardly of and fixed with the trim follower 52 at a spaced distance from the axis of the pivot post 78. As may be appreciated from FIG. 2, tension of the spring 42 will retain the follower pin 108 upwardly in engagement with the cam surfaces 102, 104, and 106 of the trim slide 50 depending on the position to which the slide 50 is adjusted.

The trim slide 50 further includes a rectangular boss formation 110 defining a recess 112 for receiving an actuating rod (not shown) by which manual adjustment of the slide 50 is facilitated. Also, it will be noted that the base flange 92 includes a depending rail 114 provided with a detent 116 intermediate its length.

The trim slide 50 is retained in its operative position on the lens mounting plate 54 in substantial measure by coaction between the planar surface 58, the bottom edge 60 of the lens mounting plate, the base rail 92 of the trim member, and a leaf spring 118 carried as an integral part of the lens mounting plate 54. As shown most clearly in FIGS. 3 and 4, the leaf spring 118 is cantilevered from a bracket formation 120 projecting forwardly of the lens mounting plate 54 and under the bottom edge 60 thereof. At the end of the leaf spring 118 is a detent pawl 122 having a detent engaging portion or detent latch 124 and a guide portion 126. The guide portion 126 overlies one side of the rail 114 to capture the rail against displacement from the planar surface 58. The guide portion further acts under the leaf spring force to bias the base flange 92 of the trim slide upwardly against the bottom edge 60 of the lens mounting plate. The projecting rail 62 along the upper edge of the surface 58 further acts to guide the trim slide 50 for reciprocal movement in a generally horizontal direction as it is illustrated in the drawings. Assembly of the trim slide 50 to the mounting plate is accomplished in a very simple manner once the trim follower 52 has been mounted in the manner described above. In particular, the trim slide 50 is merely placed over the follower pin 108 and over the guide portion of the detent pawl 122 whereupon it will be secured in place against the surface 58.

In practice, the trim slide 50 is assembled with a camera exposure control module including among other components, those illustrated schematically in FIG. 1 of the drawings. When initially assembled and in a normal exposure mode, the trim slide 50 is retained in a generally central position by engagement of the detent latch 124 with the detent 116 (see FIG. 2) in the rail 114 of the trim slide 50. In this position, the follower pin 108 on the trim follower 52 will lie in the dwell portion 106 intermediate the camming ramps 102 and 104. The connection of the spring 42 between the walking beam 14 and the trim follower 52 exerts a biasing force tending to pivot the walking beam in a direction opposite from that to which it is pivoted by energization of the solenoid 16. Thus, to initiate an exposure cycle, the solenoid 16 is initially energized to pivot the walking beam 14 against the tension of the spring 42 and to move the shutter blades 10 and 12 to a closed condition. Upon de-energization of the solenoid, the walking beam and the shutter blades will be accelerated by the force of the spring 42 toward a fully open condition. After moving toward or to a fully open condition, the walking beam and the shutter blades are returned to their closed position by re-energization of the solenoid 16 under the control of the exposure control circuit 20 and the photocell 18.

In such a normal exposure mode, the trim slide 50 is operative in two respects. First, the filter wedge portion 94 is operative to affect the response of the photocell to illumination reflected from the subject to be photographed. Secondly, the trim slide retains the spring 42 under a tension bias which may be calibrated to a precise value by appropriate selection of the hooks 88 to which the end 46 of the spring is attached. The force of the spring thus held under tension thus determines the rate at which the blades 10 and 12 are accelerated toward their open condition.

An overexposure trim mode may be effected by movement of the trim slide 50 to the right as viewed in FIG. 2 of the drawings. Such movement will both increase the density of the filter wedge portion 94 and increase the tension on the spring 42. The former has the effect of reducing the response of the cell to ambient light, thereby providing a longer exposure interval, while the latter increases the rate at which the blades 10 and 12 are accelerated to their open position, thereby providing a larger effective flash aperture. As a result, the amount of light permitted to pass on the axis A will be increased. Correspondingly, an underexposure mode is effected by moving the trim slide 50 from the position shown in FIG. 2 to the left. This will decrease the filter density of the filter portion 94 and at the same time, decrease the tension on the spring 42. Under this condition, the photocell 18 will see a larger amount of light and thus bring about a shorter time within which the solenoid 16 is energized to close the shutter blades 10 and 12. Also, the slower rate of advancement of the blades to the open position provides a smaller effective flash aperture. Consequently, in this way, both the exposure interval and the aperture stop value of the shutter blades for flash illumination may be regulated.

Thus it will be seen that as a result of the present invention, a highly effective trim mechanism is provided for automatic exposure systems in cameras and by which the stated objective among others are completely fulfilled. It is contemplated and in some measure will be apparent to those skilled in the art from the preceding description and accompanying drawings that variations and/or changes may be made in the described and illustrated embodiment without departure from the present invention. Accordingly, it is expressly intended that the foregoing description and accompanying drawings are illustrative only, not limiting, and that the true spirit and scope of the present invention be determined by reference to the appended claims.

What is claimed is:

1. A trim mechanism for an automatic exposure control system usable in a photographic camera and having a scanning shutter blade mechanism movable between closed and open conditions and defining progressively increasing aperture values as they move toward their fully open position, selectively energizable means for moving said shutter blade mechanism to said closed condition, bias means acting in opposition to said selectively energizable means for advancing said shutter blade mechanism from said closed condition toward said open condition when said selectively energizable means is de-energized, said bias means being a shutter spring having one end connected to said blade mechanism, selectively operable means for illuminating the scene with a pulse of illumination in timed relation to said blade movement so as to produce said pulse in relation to a blade aperture selected in accordance with subject distance, light-responsive means for controlling operation of said selectively energized means between energized and de-energized states, and mounting means to support said exposure control system, said trim mechanism comprising:

a trim slide having a variable density light filter coupled thereto, said trim slide being movably adjustable to shift said filter in relation to said light-responsive means and thus regulate the intensity of light passing to said light regulating means, means connecting said bias means and said trim slide for varying the force of said bias means to directly vary the rate at which said shutter blades are advanced toward said open condition, said trim slide comprising a cam mounted on said trim slide and a cam follower engaged by said cam and connected to the other end of said shutter spring, said cam defining a pair of ramp surfaces with a dwell surface interposed therebetween, and said trim mechanism additionally including spring detent means for locating said trim slide in a position such that said cam follower is in engagement with said dwell surface and for retaining said trim slide on said mounting means.

2. A trim mechanism for an automatic exposure control system usable in a photographic camera and having a pair of shutter blades defining shaped apertures movable from a closed condition in which the apertures are nonaligned, toward an open condition in which the apertures progressively register to provide a progressively enlarged effective aperture and back to said closed condition, a pivotal walking beam for simultaneously moving said shutter blades in opposite directions, a solenoid connected to said walking beam for moving said shutter blades to said closed condition when energized, a tension spring connected to said walking beam for advancing said blades to said open condition, means for illuminating the photographic scene with a pulse of light in timed relation to said blade movement so as to produce said pulse in relation to a blade aperture selected in accordance with subject distance, light responsive means including a photocell for controlling operation of said solenoid between energized and de-energized states, and mounting means to support said exposure control system, said trim mechanism comprising:

a trim slide supported movably from said mounting means and having a variable density light filter thereon, said trim slide being adjustable to shift said filter in relation to said photocell and thus regulate the intensity of light passing to said photocell, said trim slide also having a cam surface thereon movable with respect to said mounting means together with said light filter;

a trim slide follower pivotally supported on a pivot axis from said mounting means and having a follower pin spaced from said pivot axis to engage said cam surface; and a tension spring connected at one end to said walking beam and at the other end to said trim follower, said tension spring being effective to bias said walking beam in opposition to said solenoid so as to advance said shutter blades toward said open condition upon de-energization of said solenoid, said cam surface being oriented with respect to said trim slide and said follower to increase the tension of said spring when said trim slide is moved to increase the effective density of said filter over said photocell and correspondingly, to decrease the tension of said spring upon movement of said slide to decrease the effective density of said filter over said photocell, said cam surface comprising a pair of similarly inclined ramp surfaces with a dwell surface interposed therebetween, and additionally including spring detent means for yieldably retaining said trim slide in an intermediate position with said follower pin engaging said dwell surface.

3. A trim mechanism for an automatic exposure control system usable in a photographic camera and having a pair of shutter blades defining shaped apertures movable from a closed condition in which the apertures are nonaligned, toward an open condition in which the apertures progressively register to provide a progressively enlarged effective aperture and back to said closed condition, a pivotal walking beam for simultaneously moving said shutter blades in opposite directions, a solenoid connected to said walking beam for moving said shutter blades to said closed condition when energized, a tension spring connected to said walking beam for advancing said blades to said open condition, means for illuminating the photographic scene with a pulse of light in timed relation to said blade movement so as to produce said pulse in relation to a blade aperture selected in accordance with subject distance, light responsive means including a photocell for controlling operation of said solenoid between energized and de-energized states, and mounting means to support said exposure control system, said trim mechanism comprising:

a trim slide movably supported on said mounting means and having a variable density light filter thereon, said trim slide being adjustable to shift said filter in relation to said photocell and thus regulate the intensity of light passing to said photocell, said trim slide also having a cam surface thereon movable with respect to said mounting means together with said light filter;

a trim slide follower pivotally supported on a pivot axis from said mounting means and having a follower pin spaced from said pivot axis to engage said cam surface; and a tension spring connected at one end to said walking beam and at the other end to said trim follower, said tension spring being effective to bias said walking beam in oposition to said solenoid so as to advance said shutter blades toward said open condition upon de-energization of said solenoid, said cam surface being oriented with respect to said trim slide and said follower to increase the tension of said spring when said trim slide is moved to increase the effective density of said filter over said photocell and correspondingly, to decrease the tension of said spring upon movement of said slide to decrease the effective density of said filter over said photocell, said cam surface comprising a pair of similarly inclined ramp surfaces with a dwell surface interposed therebetween, and said trim slide additionally including spring detent means for yieldably retaining said trim slide in an intermediate position with said follower pin engaging said dwell surface, and said mounting means comprising a lens mounting plate having a planar surface extending from a linear edge, said trim slide comprising a body plate and a projecting flange along one edge, and said trim mechanism further including a leaf spring means supported by said lens mounting plate for retaining said flange against said linear edge and said body plate against said planar surface.

4. The apparatus of claim 3 wherein said lens mounting plate includes a recessed floor adjacent said planar surface, said trim follower being retained against said recessed floor adjacent said trim slide.

5. The apparatus of claim 3 wherein said trim slide includes a detent and wherein said leaf spring means includes a detent pawl for yieldably engaging said detent to retain said trim slide in an intermediate position.

6. A trim mechanism for an automatic exposure control system usable in a photographic camera having a scanning shutter mechanism including blades movable between closed and open conditions and defining progressively increasing aperture values as they move toward their fully open position, a shutter spring having one end connected to said shutter mechanism for controlling advancement of said blades toward their open condition, means for illuminating the scene with a pulse of illumination in timed relation to blade movement so as to produce said pulse in relation to a blade aperture selected in accordance with subject distance, and mounting means to support said exposure control system, said trim mechanism comprising:

a trim slide coupled to the other end of said shutter spring, said trim slide being movably adjustable for varying the force of said spring on said blade mechanism to directly vary the rate at which said shutter blades are advanced toward said open condition, said trim slide comprising a cam mounted on said trim slide and a cam follower engaged by said cam and connected to said other end of said shutter spring, said cam defining a pair of ramp surfaces with a dwell surface interposed therebetween, and said trim mechanism additionally including spring detent means for both locating said trim slide in a position such that said cam follower is in engagement with said dwell surface and for retaining said trim slide on said mounting means.

* * * * *